Figure 1:
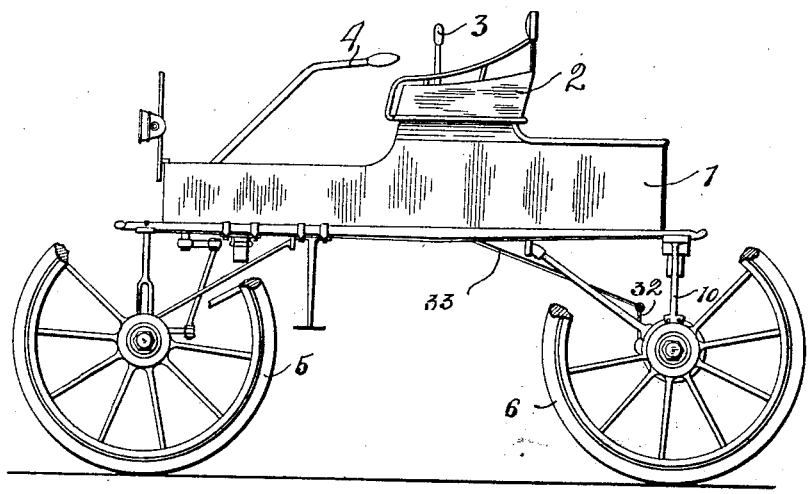

No. 716,065. Patented Dec. 16, 1902.
J. LEDWINKA.
AUTOMOBILE.
(Application filed Jan. 31, 1902.)

(No Model.) 2 Sheets—Sheet 1.

Witnesses
Inventor
Joseph Ledwinka
By Charles A. Brown, Cragg & Orefield
Attorneys

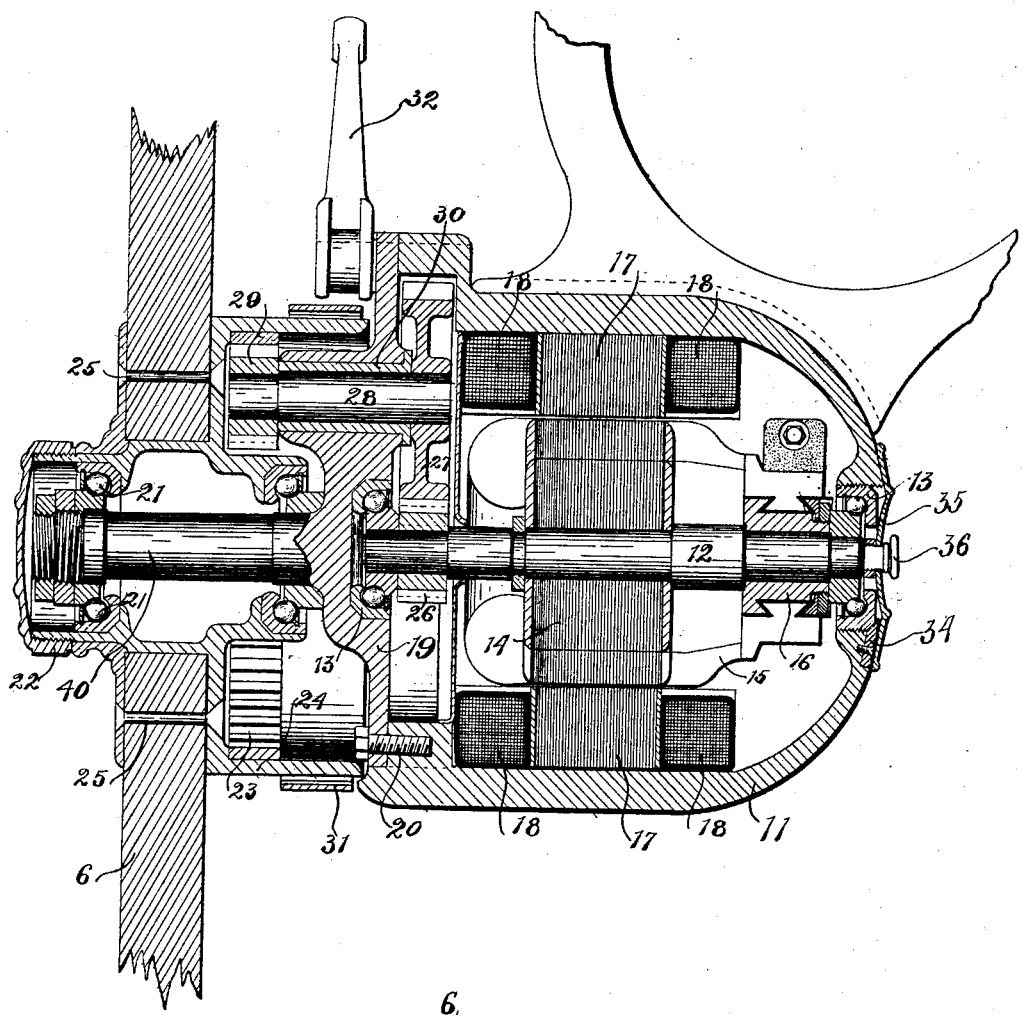

UNITED STATES PATENT OFFICE.

JOSEPH LEDWINKA, OF CHICAGO, ILLINOIS, ASSIGNOR, BY DIRECT AND MESNE ASSIGNMENTS, TO IMPERIAL ELECTRIC MOTOR COMPANY, OF CHICAGO, ILLINOIS, A CORPORATION OF ILLINOIS.

AUTOMOBILE.

SPECIFICATION forming part of Letters Patent No. 716,065, dated December 16, 1902.

Application filed January 31, 1902. Serial No. 92,050. (No model.)

*To all whom it may concern:*

Be it known that I, JOSEPH LEDWINKA, a subject of the Emperor of Austria-Hungary, residing at Chicago, in the county of Cook and State of Illinois, have invented a certain new and useful Improvement in Automobiles, (Case No. 1,) of which the following is a full, clear, concise, and exact description, reference being had to the accompanying drawings, forming a part of this specification.

My invention relates in particular to the driving mechanism of automobiles.

Prominent objects of my invention are to permit each of several wheels of the vehicle to be independently driven in a practical and commercial manner, to make the entire driving mechanism as simple and compact as possible, to avoid unduly projecting the hub or hub portion of the wheel to the exterior of the body of the wheel, to reduce the length of the radius about which the driven wheels are rotated, and thereby facilitate the turning of the vehicle, and to accomplish the foregoing and other desirable results in an effective and efficient manner.

In the arrangement which I herein show for carrying out my invention I provide a plurality of motors or motor members, one for each of several wheels of the vehicle, by which those wheels are independently driven. It may be that two of the vehicle-wheels are driven or that all four are driven, depending upon the kind of vehicle and the nature of the service and other circumstances. Each motor is mounted at or near the inner side of the wheel it is to drive near the hub thereof and is properly connected with the wheel, so as to drive the same. By thus mounting the motor close to the wheel, but on the inner side of the same, I can provide each wheel with a motor for independently driving it, and at the same time each motor and its driven wheel are closely and compactly associated together to secure the results of cheapness and simplicity of construction and economy and efficiency of operation. Furthermore, the motor being at the inner side of the wheel allows the wheel to be constructed in the usual or substantially the usual way, and thereby avoids any projection on the outer or exterior side of the wheel. As a convenient arrangement each motor can be mounted at one end of a vehicle-axle—that is to say, at that portion of the axle terminating at the inner side of the vehicle-wheel. In this way a single axle or axle member or construction can be provided with two motors, one for each wheel of the axle. As a matter of further and specific improvement a pivotal connection can be arranged between the motor and its driven wheel and the vehicle—as, for example, a pivotal or knuckle connection between each motor and the wheel-axle upon which it is mounted, in case it is mounted at the end of the axle, as before suggested. In such case the distance between the point of pivotal connection and the plane of the wheel is short and can be made as small as possible, as a result of which the length of the radius about which the wheel turns is very short and can be reduced as much as desired. As a matter of still further improvement the motor is inclosed in a shell or casing, by which it is adequately protected and shielded, and where the wheel and motor together are pivotally connected with the vehicle this pivotal connection can conveniently be made with this shell or casing. If desired, this shell or casing can be made of metal and arranged to serve as the field-magnet of the motor.

I will explain my invention more in detail by reference to the accompanying drawings, illustrating one means of carrying out the same, in which—

Figure 2:
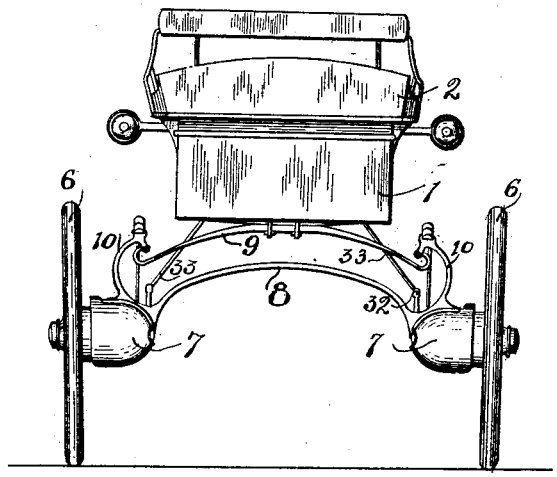

Figure 1 is a view in elevation of a vehicle equipped with my invention, portions thereof being broken away to more clearly reveal features of construction. Fig. 2 is an end view of the vehicle illustrated in Fig. 1. Fig. 3 is a cross-sectional view through a motor employed in connection with my invention. Fig. 4 is a detailed view showing a modification of construction.

Like characters of reference indicate like parts throughout the different figures.

I will explain an embodiment of my invention as used in connection with an ordinary runabout road-vehicle supplied with a plurality of motors associated with the driving-wheel thereof, said vehicle comprising a body portion 1, provided with a seat 2, an operating-handle 3 for controlling the speed of the vehicle, and a steering-handle 4. The vehicle is provided with front wheels 5 and rear driving-wheels 6. The rear wheels 6 in the preferred embodiment thereof herein shown are the only wheels associated with the electric driving-motors 7 7 for propelling the vehicle. The external shell of the motor 7 is preferably fixedly secured to and mounted upon the rear-axle bar 8, upon which through the interposition of suitable springs 9 the body portion 1 of the vehicle is mounted, said springs being pivotally secured, preferably, to ornamental vertical standards 10 10, which may be an integral part of the axle-bar 8, as herein shown. Motors of considerable size may be associated with the driving-wheels in the vehicle of my preferred construction while still retaining the advantages above enumerated of compactness, efficiency of operation, and ease of manipulation and regulation. The motors, as before stated, are so arranged in close proximity to the driving-wheels that no dust or dirt has access thereto, and their operating parts are so associated as to prevent them from becoming disarranged, which advantages cannot be obtained if the motor is mounted, for instance, centrally of the vehicle and connected to the driving-wheels by means of a gear which is more or less exposed to the influences of the dust and dirt. The motor of this new construction, which is completely inclosed by the casing 11, within which it is mounted, and which casing is preferably securely fastened to the axle-bar 8, is placed in close proximity to the driving-wheels 6.

My improved motor is provided with an armature-shaft 12, suitably supported in the journals 13 13 by means of ball or flat bearings. The armature-shaft carries a core 14 and suitable conductors 15, which have connection with a commutator 16, which commutator is also mounted upon the shaft 12. The motor-casing 11 also supports salient field-poles 17 17, about which field energizing-coils 18 18 are mounted. The motor thus far described is an almost completely inclosed structure, to which neither dust nor dirt have access. A separate supporting-shaft 40, about which the driving-wheel 6 is rotatable, is fixedly secured to the motor-casing 11 through the interposition of a cover-plate 19, secured to the casing 11 by suitable bolts 20. The structure is compact and strong and not liable to breakage.

The driving-wheel 6, which is rotatable about the shaft 40, is mounted thereon through the interposition of two ball-bearings 21 21, a suitable cap 22 being provided, so that access may be readily had to the interior of said ball-bearings and the hub of the wheel. The driving-wheel 6 is provided on the inside thereof with an annular gear 23, which is suitably placed within a cup-shaped casing 24, the said annular gear 23 and the cup-shaped casing 24 being rigidly secured to the driving-wheel 6 by means of the bolts 25.

Driving power is transferred from the motor-shaft 12 to the annular gear 23, in accordance with my invention, through the interposition of double reduction-gearing. The motor-shaft 12 has a driving-pinion 26, engaging a gear-wheel 27, fixedly mounted upon a counter-shaft 28, which counter-shaft also carries a second pinion 29, engaging the annular gear 23. The counter-shaft 28 projects through the cap-plate 19, which incloses the space occupied by the motor-windings, a suitable bearing 30 being for this purpose provided in said cap-plate.

The cup-shaped casing 24, which incloses the annular gear 23, is so arranged as to be in close proximity to an end face of the cap-plate 19, so that the annular gear and its associated pinion 29 are prevented from abnormal wear, which would be occasioned if dust and dirt have ready access to the bearing-surfaces of said gears. The cup-shaped casing 24 is likewise used in the preferred embodiment of my invention to act as a shell for a band-brake 31, which may be suitably applied and whose braking action can be readily regulated by means of a lever 32, which may be fixedly mounted on the casing 11 of the cap-plate 19 as desired. A brake-bar 33 may be secured to the lever 32 to effect its actuation from some place convenient in the body portion of the vehicle.

The advantages of my new construction will thus be readily apparent. The motor, which may be of considerable size, is mounted in close proximity to the driving-wheel and the casing of the motor is fixedly secured to the axle-bar 8 through the interposition of the suitable gearing mechanism comprising the pinions 26 and 29 and the gear 27. Power is transferred from the motor-shaft 12 to the driving-wheel. In order to readily adjust the motor-shaft bearings, I provide the rear bearing with an adjusting arrangement by threading the journals 13, that are formed by the end of the casing 11. The stop 34 prevents the bearing from being withdrawn, and a cap 35 is placed at one end of the casing 11 and suitably held thereon by means of a screw 36. This motor may also, if desired, be so mounted that the same may be steered in conjunction with the front wheels of the vehicle, which may be readily accomplished by giving the motor a pivotal mounting upon the supporting-axle, as will be readily understood by those skilled in the art by reference to Fig. 4, in which the motor 7 is pivotally mounted between pivots 37 37, and I do not, therefore, wish to limit myself to the construction wherein the motor is fixedly secured to a fixed axle-bar.

It will be readily apparent that my invention is susceptible of a great variety of modifications without departing from the spirit thereof, and I do not wish, therefore, to limit myself to the precise construction and arrangement as herein shown and particularly described; but,

Having thus described my invention, I claim as new, and desire to secure by Letters Patent, the following:

1. In a vehicle, the combination with one of the wheels thereof, of a motor member arranged at the inner end of the wheel-hub, means for mounting the motor member so that it in effect forms a single unitary structure with the wheel-axle, and a pivotal connection between said unitary structure and the axle member, whereby the motor member and wheel together can be turned relatively to the axle member, substantially as described.

2. In a vehicle, the combination with one of the wheels thereof, of a motor member therefor, a casing inclosing the motor member and arranged at the inner end of the wheel-hub, and a pivotal connection between the casing and the vehicle, substantially as described.

3. In a vehicle, the combination with a pair of wheels, and an axle member therefor, of motor members arranged at or near the end of the axle member and at or near the inner ends of the vehicle-hubs, casings inclosing the motor members, and pivotal connections between said casings and the ends of the axle member, substantially as described.

4. The combination of a vehicle-wheel, a motor having a casing, and an axle for the vehicle-wheel secured rigidly to the motor-casing, substantially as set forth.

5. The combination of a motor and a wheel-axle secured rigidly to the motor-casing, substantially as set forth.

6. The combination of a motor having a casing, one of whose ends is formed with a projection adapted to constitute a vehicle-axle, substantially as set forth.

7. The combination of a motor having a casing, one of whose ends is made detachable and constructed with a projection adapted to constitute a vehicle-axle, substantially as set forth.

8. The combination with a vehicle-wheel, of a motor arranged at one side of the wheel but close to the same, a casing for the motor, the side of said casing nearest the wheel being made detachable and constructed with an elongation adapted to constitute the wheel-axle, and power-transmitting connection between the motor and wheel, substantially as set forth.

9. A motor-casing constructed with a projection adapted to form a wheel-axle.

10. A motor-casing constructed with a detachable end made with a projection adapted to form a wheel-axle.

11. In a vehicle, the combination with a vehicle-body, of an axle associated therewith, a driven wheel, a motor for driving said wheel, a casing provided about said motor, said casing being fixedly mounted about said axle, a cap-plate for said motor, a shaft secured to said motor about which the driven wheel of the vehicle is rotatably mounted, and gearing interposed between the motor and the driven wheel for rotating the same, substantially as described.

12. In a vehicle, the combination with a vehicle-body, of an axle associated therewith, a driven wheel, an annular gear provided upon said driven wheel, a motor for driving said driven wheel, a casing for said motor, said casing being fixedly secured to the axle, a cap-plate for said motor-casing and a shaft provided thereon about which said driven wheel is rotatably mounted, a counter-shaft, and gearing mounted upon said counter-shaft for engaging the annular gear with the shaft of the motor for the purpose of rotating the driven wheel, substantially as described.

13. In a vehicle, the combination with a vehicle-body, of an axle associated therewith, a driven wheel, a motor for driving said wheel, a casing provided about said motor, said casing being fixedly mounted about said axle, a cap-plate for said motor, a shaft secured to said motor about which the driven wheel of the vehicle is rotatably mounted, gears interposed between the motor and the driven wheel for rotating the same, and a casing associated with said driven wheel for inclosing the driving-gears, substantially as described.

14. The combination with the wheel and motor mounted at or near the inner end of the wheel-hub, of an internal gear on the wheel, an axle on which the wheel is mounted for rotation, a pinion on the end of the motor-shaft, and a supplemental shaft having a pinion gearing with the internal gear on the wheel and also having a gear meshing with the pinion on the end of the motor-shaft, substantially as described.

15. The combination with the wheel and an axle upon which the wheel is mounted for rotation, of a motor arranged at or near the inner end of the wheel-hub from whose casing the axle for the wheel projects, a gear on the wheel, a supplemental shaft mounted in a motor-casing and having one of its ends inside and the other outside of such casing, a pinion on the outer end of said supplemental shaft gearing with the gear on the wheel, a gear-wheel on the inner end of said shaft, and a pinion on the end of the motor-shaft gearing with said gear on said supplemental shaft, substantially as described.

16. The combination with a wheel and axle therefor, of a motor mounted at or near the inner end of the wheel-hub, a supplemental shaft extending through the motor-casing and having its inner end on the outside and its outer end inside thereof, and gearing between the outer end of said supplemental shaft and the wheel, and the inner end of said supplemental shaft and the motor.

17. The combination with the wheel, of an axle about which the wheel can rotate, a motor mounted at or near the inner end of the wheel-hub, the casing of the motor being provided with said axle and the motor-shaft being journaled in the casing, a supplemental shaft mounted in and extending through the casing, and gearing between the outer end of said supplemental shaft and the wheel, and the inner end of the same and the motor-shaft, substantially as described.

In witness whereof I hereunto subscribe my name this 17th day of January, A. D. 1902.

JOSEPH LEDWINKA.

Witnesses:
A. MILLER BELFIELD,
HARVEY L. HANSON.